3,657,351
PROCESS FOR THE PREPARATION OF
2,6,8-TRIMETHYL-4-NONANONE
Michio Araki, Tokyo, Hiroshi Uchida, Ichinomiya-shi, and Yoshihide Kotera, Kawasaki-shi, Japan, assignors to Agency of Industrial Science & Technology, Tokyo, Japan
No Drawing. Filed Sept. 27, 1968, Ser. No. 763,347
Claims priority, application Japan, Sept. 30, 1967, 42/62,694
Int. Cl. C07c 45/16
U.S. Cl. 260—593 R    2 Claims

ABSTRACT OF THE DISCLOSURE

A process of preparing 2,6,8-trimethyl-4-nonanone which comprises passing a secondary alcohol or a mixture thereof with the corresponding ketone through a binary catalyst prepared from chromium oxide and copper oxide or a ternary catalyst prepared from chromium oxide, copper oxide and zinc oxide at from about 200° C. to about 350° C.

BACKGROUND OF THE INVENTION

This invention relates to a process of preparing 2,6,8-trimethyl-4-nonanone.

2,6,8-trimethyl-4-nonanone (hereinafter referred to as TMN) has been known as a very superior dispersant for use with vinyl chloride in the shaping thereof and a good solvent for organic stabilizers.

Heretofore, it has been known that TMN can be obtained by the dehydration-condensation of two moles of methyl isobutyl ketone (hereinafter referred to as MIBK) using calcium carbide as a catalyst and then catalytic hydrogenation of the resulting unsaturated ketone containing 12 carbon atoms. However, this known method was hardly ever utilized industrially since it involves two reaction steps, dehydration-condensation and subsequent hydrogenation, requires a distillation-purification step after each of said steps, and is thereby made complicated.

The object of this invention is to provide a process of easily preparing TMN in a single step.

DETAILED EXPLANATION OF THE INVENTION

The present inventors found that a high molecular ketone including TMN can be prepared from a secondary alcohol alone or a mixture thereof with the corresponding ketone by using a binary catalyst prepared from chromium oxide and copper oxide or a ternary catalyst prepared from chromium oxide, copper oxide and zinc oxide.

The raw material employed in this invention is a secondary alcohol which is used either independently or in admixture with the corresponding ketone, said alcohol including isopropyl alcohol (hereinafter referred to as IPA) and methyl isobutyl carbinol (hereinafter referred to as MIBC) and said ketone including acetone which is used in combination with said IPA and methyl isobutyl ketone (hereinafter referred to as MIBK) which is used in combination with said MIBC. The mixing ratio of said alcohol and said ketone is up to 1:1 (mole ratio), and, when the ketone is used in a larger amount, hydrogen must be supplied to the mixture during the reaction.

As the catalyst, a binary catalyst prepared from chromium oxide and copper oxide, or a ternary catalyst prepared from chromium oxide, copper oxide and zinc oxide, is found to be effective for any of the raw materials as set forth above.

The reaction temperature in this invention is from 200° to 350° C., preferably from 220° to 300° C. At temperatures above 350° C., high-boiling compounds and light gases increase abruptly, and the life of the catalysts may be shortened.

When IPA alone or a mixture thereof with acetone is used as raw material, by-products such as acetone, MIBK, diisobutyl ketone (hereinafter referred to as DIBK) and the like may also be produced, but TMN can easily be separated from these by-products by distillation under reduced pressure. When MIBC alone or a mixture thereof with MIBK is used as raw material, the conversion of MIBC to TMN reaches about 60 mole percent, and the by-product to be formed is substantially only MIBK. This by-product may be hydrogenated and reused as raw material.

DESCRIPTION OF PREFERRED EMBODIMENTS

The following examples illustrate the process of this invention, but are not construed as limiting the invention.

EXAMPLE 1

The mixture obtained by dissolving copper oxide in an aqueous solution of chromic acid was kneaded alone in the case of a binary catalyst or with zinc oxide in the case of a ternary catalyst and thereafter air-dried and reduced with a gas consisting of a mixture of carbon monoxide and hydrogen to prepare a binary or ternary catalyst.

The composition of reaction products became stationary after 24 hours when a vapour of IPA was passed through the catalyst at a reaction temperature of 250° C. (The liquid hourly space velocity of said IPA was 2 hr.$^{-1}$.)

The compositions of the catalysts prepared and the composition of the resulting reaction product in the stationary state were as shown in Table 1, in which Cr:Cu:Zn represents an atomic ratio of the elements composing the catalysts.

TABLE 1

| Catalyst composition, Cr:Cu:Zn | Reaction temp. (° C.) | Composition of the reaction product (percent conversion of IPA) | | | | | | |
|---|---|---|---|---|---|---|---|---|
| | | TMN | DIBK | MIBK | MIBC | Acetone | IPA | Others |
| 1:2:0 | 248 | 12 | 24 | 32 | 1 | 26 | 2 | 3 |
| 1:0.1:1 | 248 | 0 | 2 | 17 | 1 | 72 | 7 | 1 |
| 1:0.3:1 | 249 | 4 | 9 | 18 | 1 | 61 | 6 | 1 |
| 1:0.5:1 | 255 | 13 | 27 | 29 | 1 | 27 | | 3 |
| 1:2:1 | 250 | 3 | 11 | 30 | 1 | 48 | 5 | 2 |
| 0.1:0.05:1 | 250 | 4 | 15 | 29 | 1 | 45 | 4 | 2 |

EXAMPLE 2

A ternary catalyst prepared from Cr:Cu:Zn in a ratio of 1:0.5:1 was prepared in the same manner as in Example 1, and a vapour of IPA was passed over the catalyst. The reaction temperature and the composition of the resulting reaction product in the stationary state were as shown in Table 2.

TABLE 2

| Reaction temperature (° C.) | Composition of the reaction product (percent conversion of IPA) | | | | | | |
|---|---|---|---|---|---|---|---|
| | TMN | DIBK | MIBK | MIBC | Acetone | IPA | Others |
| 170 | 0 | 0 | 2 | 1 | 50 | 47 | 0 |
| 209 | 1 | 4 | 20 | 3 | 53 | 18 | 1 |
| 255 | 13 | 27 | 29 | 1 | 27 | 0 | 3 |
| 299 | 16 | 31 | 31 | | 17 | 0 | 5 |
| 350 | 13 | 21 | 38 | | 21 | 0 | 7 |

EXAMPLE 3

A vapour of MIBC was passed over a ternary catalyst having the same composition as in Example 2. The reaction temperature and the composition of the resulting reaction product in the stationary state were as shown in Table 3.

TABLE 3

| Reaction temperature (° C.) | Composition of the reaction product (Percent conversion of MIBC) | | | |
|---|---|---|---|---|
| | TMN | MIBK | MIBC | Others |
| 197 | 7 | 75 | 18 | 0 |
| 226 | 31 | 62 | 6 | 1 |
| 249 | 55 | 41 | 2 | 2 |
| 279 | 62 | 33 | 2 | 3 |
| 322 | 44 | 28 | 0 | 28 |

EXAMPLE 4

MIBC alone and a mixture thereof with MIBK in a molar ratio of 1:1 were separately passed over a ternary catalyst having the same composition as in Example 2 at a temperature of 250° C. The composition of each of the resulting products was as shown in Table 4.

TABLE 4

| Raw material | Composition of reaction product (Percent conversion of MIBC) | | | |
|---|---|---|---|---|
| | TMN | MIBK | MIBC | Others |
| MIBC+MIBK | 62 | 33 | 4 | 1 |
| MIBC alone | 55 | 41 | 2 | 2 |

What is claimed is:

1. A process of preparing 2,6,8-trimethyl-4-nonanone which consists essentially of passing a secondary alcohol selected from the group consisting of isopropyl alcohol and methyl isobutyl carbinol at atmospheric pressure and at a temperature from about 200° C. to about 350° C. through a catalyst selected from the group consisting of chromium oxide and copper oxide binary catalyst having an atomic ratio of Cr:Cu of 1:2, and chromium oxide, copper oxide and zinc oxide ternary catalyst having an atomic ratio of Cr:Cu:Zn of 1:0.5:1; and recovering 2,6,8-trimethyl-4-nonanone from the reaction product.

2. The process of claim 1, wherein the secondary alcohol and the ketone corresponding thereto are passed in admixture through the catalyst, the ketone being acetone and methyl isobutyl ketone, respectively.

References Cited

UNITED STATES PATENTS

| 2,218,457 | 10/1940 | Winans | 260—596 |
| 2,697,730 | 12/1954 | Mecorney et al. | 260—596 |
| 2,725,400 | 11/1955 | Mecorney et al. | 260—596 |

FOREIGN PATENTS

| 723,280 | 2/1955 | Great Britain | 260—596 |
| 804,132 | 11/1958 | Great Britain | 260—596 |

BERNARD HELFIN, Primary Examiner

W. B. LONE, Assistant Examiner